(12) United States Patent
Yellin et al.

(10) Patent No.: US 9,880,456 B1
(45) Date of Patent: Jan. 30, 2018

(54) VARIABLE ASPECT RATIO MEDIA SCREEN FRAME

(71) Applicants: Robert Yellin, Austin, TX (US); Dan Poirier, Austin, TX (US)

(72) Inventors: Robert Yellin, Austin, TX (US); Dan Poirier, Austin, TX (US)

(*) Notice: Subject to any disclaimer, the term of this patent is extended or adjusted under 35 U.S.C. 154(b) by 0 days.

(21) Appl. No.: 15/287,960

(22) Filed: Oct. 7, 2016

Related U.S. Application Data

(60) Provisional application No. 62/242,450, filed on Oct. 16, 2015.

(51) Int. Cl.
*G03B 21/58* (2014.01)
*H04N 9/31* (2006.01)

(52) U.S. Cl.
CPC ........... *G03B 21/58* (2013.01); *H04N 9/3194* (2013.01)

(58) Field of Classification Search
CPC .............................. G03B 21/58; H04N 9/3194
USPC ....................................................... 359/461
See application file for complete search history.

(56) References Cited

U.S. PATENT DOCUMENTS

| | | | |
|---|---|---|---|
| 5,175,627 A | 12/1992 | Josephs | |
| 5,343,257 A | 8/1994 | Kohno et al. | |
| 5,523,880 A | 6/1996 | Pidgeon | |
| 5,526,066 A | 6/1996 | Kikuchi | |
| 5,737,123 A | 4/1998 | Donohoe | |
| 6,507,435 B1 | 1/2003 | Bergman | |
| 6,690,425 B1 | 2/2004 | Worrell | |
| 7,236,695 B1 * | 6/2007 | Demos | G03B 15/06 16/241 |
| 7,466,483 B2 | 12/2008 | Danthony | |
| 8,089,567 B2 | 1/2012 | Chung | |
| 9,329,468 B2 * | 5/2016 | Miggiano | G03B 21/58 |
| 2002/0057389 A1 | 5/2002 | Ananian et al. | |
| 2002/0109794 A1 | 8/2002 | Bergman | |

* cited by examiner

*Primary Examiner* — Christopher Mahoney
(74) *Attorney, Agent, or Firm* — Kirk A. Buhler; Buhler & Associates

(57) ABSTRACT

Improvements in a variable aspect ratio media screen frame are disclosed. The variable aspect ratio media screen frame includes a frame or chassis consisting of a fixed central portion and one or more movable side, top and bottom wings. The movable wing(s) nests inside the center frame. The movable wing(s) nest(s) inside said fixed central portion for a smaller aspect ratio, and at least partially exists outside the fixed central portion for a larger aspect ratio. The variable aspect ratio media screen frame allows the viewing media to deploy from the front of the viewing area, into a storage area encased, out of view, in the movable frame. The current embodiment employs an overlapping "U" shaped roller channel to move the screen from the front to the back of the frame, and springs and tension bars to maintain even tension on the viewing media at all times.

19 Claims, 5 Drawing Sheets

VARIABLE ASPECT RATIO MEDIA SCREEN FRAME

CROSS REFERENCE TO RELATED APPLICATIONS

This application claims the benefit of Provisional Application Ser. No. 62/242,450 filed Oct. 16, 2015 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a media display screen frame. More particularly, the present media display screen frame has movable frame members and screen that are adjusted to fit the aspect ratio of an image being projected onto the screen within the frame.

Description of Related Art Including Information Disclosed Under 37 CFR 1.97 and 1.98

Current video content is rendered in a variety of aspect ratios (width/height), on a given video media. The current methods of framing the viewing media (screen, active fabric, etc.), typically involve panels, shades, or draperies mounted to a fixed frame in front of the viewing media that move in or out to mask off the areas of the screen which is not used by any particular aspect ratio. The area being masked will be referred to as the border area. These devices are referred to as "masking" screens. The external proportions of the fixed frame never vary, but the border area does. Therefore, the masked border area must assume various dimensions to produce a resultant viewing area in various aspect ratios.

U.S. Pat. No. 6,507,435 issued on Jan. 14, 2003 for Anthonie H. Bergman entitled Variable Size Projection Screen Apparatus with a Projection Screen that is Physically Resizable in a Lateral Direction on at Least Two Distinct Levels, and a Screen Arrangement for use in Such Apparatus. This patent uses a motor arrangement that can physically resize a borderless screen in a lateral direction to at least two distinct widths, but this invention suffers from some serious deficiencies.

U.S. Pat. No. 6,507,435 contains no mechanism for bordering the screen with a bezel. It is frameless, consisting of a masking cabinet for vertical dimension variability and a variable sized screen supported by scrolls that roll the screen on each lateral side for horizontal variability. There is no mechanism for maintaining the screen in a flat and evenly tensioned plane as the screen is unsupported along its length. The object of U.S. Pat. No. 6,507,435 is to scale an image up or down, while maintaining the same aspect ratio of width to height. As such, it scales sizes within a fixed aspect ratio. It further employs a fixed cabinet for masking the vertical dimensions of the screen. This necessitates a mounting or wall area that is equal to at least twice the height of maximum screen size. U.S. Pat. No. 6,507,435 discloses a borderless rendering of the screen around a curved scroll. It presents an impractical and unpleasing edge effect to a displayed video media. Many aspect ratio video beam rendering systems require a degree of "overscan" of the image into a light absorbing border area of the screen frame when the image does not render in perfectly rectilinear fashion. Absent a screen frame, there is no way to accomplish over scan or uniform tensioning of the screen as required. Rather than maintain the same aspect ratio as in U.S. Pat. No. 6,507,435, the mechanism in this disclosure changes the aspect ratios of the frame rather than maintaining a fixed aspect ratio of scaled video content on a frameless screen.

U.S. Pat. No. 8,089,567 issued on Jan. 3, 2012 to Yau Wing Chung entitled Methods and Systems for Displaying Video on an Adjustable Screen. Screen covers are moved horizontally or vertically to increase or decrease the viewing area of the screen. The video is then optically resized to fit the new height or width of the viewing area.

What is needed is a movable media display screen frame with fixed borders and movable frame members that are adjusted to fit the aspect ratio of an image being rendered in the enclosed screen within the frame. The screen area changes by deploying screen material from within the side borders or top and bottom borders as appropriate to achieve a given aspect ratio. The viewing area of the screen is bound by fixed width borders, capable of absorbing overscan, and allowing a sharp, flat, and discernable demarcation of the edge of the viewing area of the screen where the frame begins. Furthermore, the screen frame provides a mechanism for hanging and tensioning the screen material without wrinkles or potential for uneven soiling due to environmental contaminants. The media display screen frame disclosed in this document provides the solution.

BRIEF SUMMARY OF THE INVENTION

It is an object of the variable aspect ratio media screen frame to include a frame or motorized chassis consisting of a fixed upper and lower portions and one or more movable side wing(s) to achieve horizontal expansion of the frame. In an alternative embodiment, a fixed side frame and movable upper and lower wing(s) may be used to accomplish the same result vertically. The movable frame wing(s) nest inside the fixed frame. The movable wing(s) nest deeply inside said fixed central portion for a smaller aspect ratio, and at less deeply of the fixed central portion for a larger aspect ratio where the aspect ratios may range from relatively square to elongated rectangular shapes.

It is another object of the variable aspect ratio media screen frame to have a screen tensioning system to maintain a flat and even surface as the screen material is moved to the viewing area. The variable aspect ratio media screen frame allows deploying viewing media (while moving to different aspect ratios) and hiding viewing media (when moving the frame to smaller aspect ratios) so as to maintain a uniformly tensioned flat even surface.

It is another object of the variable aspect media screen frame to contain a screen and frame deployment mechanism which allows the concealment of the unviewed portions of the screen, while not scrolling or rolling the screen onto itself within the border frame. Over time screens will reveal compressed dust and other environmental contaminants if the screen is continuously rolled onto itself. Furthermore, extending the frame and rolling of the screen provides no means of achieving even tensioning. The deployment mechanism keeps the environmental influences on the screen material uniform across the viewed and non-viewed surfaces of the screen while maintaining even tension. The variable aspect frame disclosed in this document provides a solution.

It is another object of the variable aspect ratio screen frame to require no additional wall space than that required to house the largest expanded size of the frame bezel. This reduces a requirement of the installer and/or the home or business to maintain additional space around the maximum size of the expanded screen frame.

It is another object of the variable aspect ratio media screen frame to have active display elements, such as but not limited to, LED, LCD and OLED where the screen could also be flexible and changes size to only show the pixels that are illuminated.

It is still another object of the variable aspect ratio media screen frame to include an embodiment which allows the viewing media to "roll" from the front of the viewing area, into a storage area encased in the movable side frame members, and out of view. The current embodiment employs a "U" shaped roller channel to move the screen from the front to the back of the frame and uses springs to maintain even tension on the flexible viewing media at all times.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
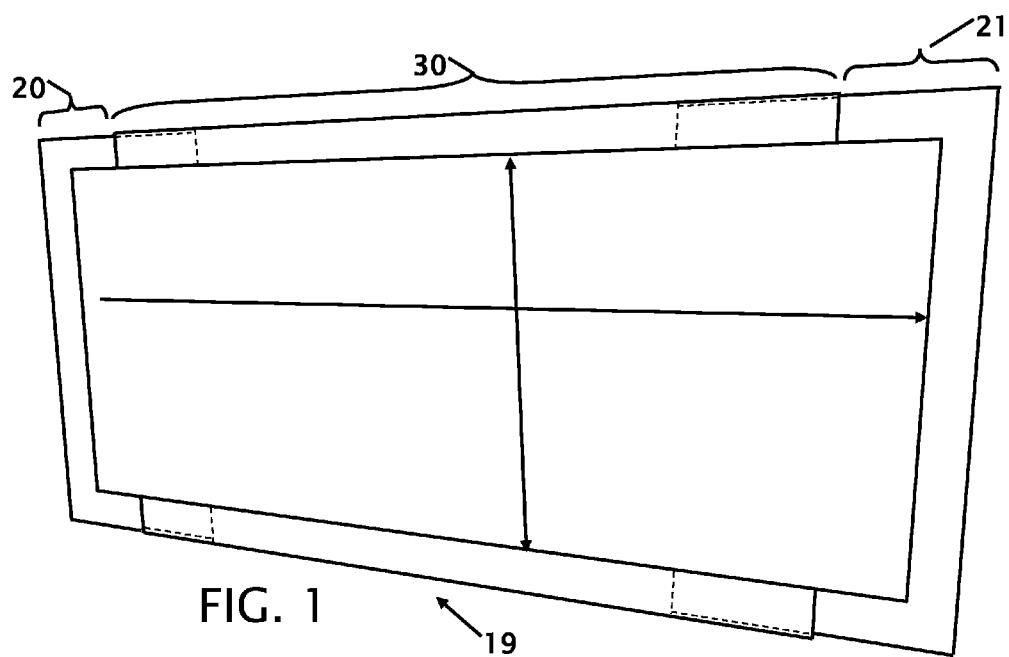
FIG. 1 shows a front perspective view of the variable aspect ratio media screen frame at a first aspect ratio.
Figure 2:
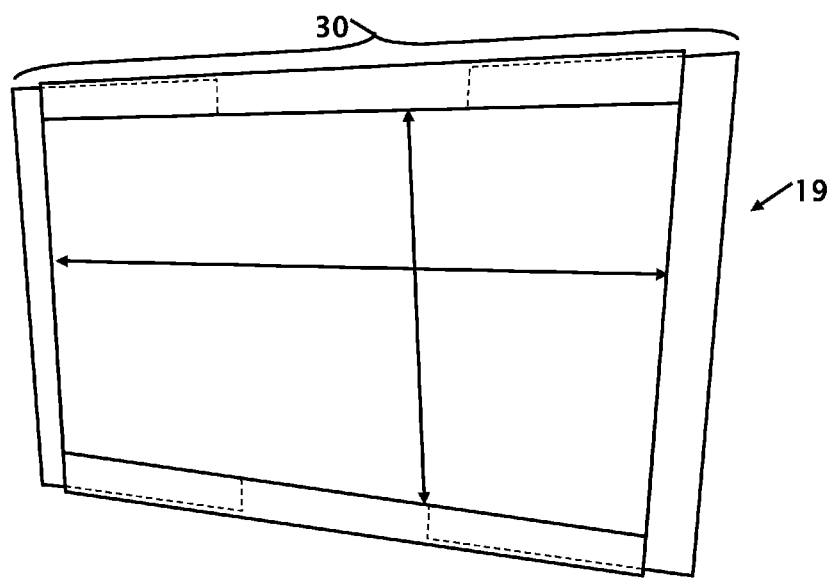
FIG. 2 shows another front perspective view of the variable aspect ratio media screen frame at a second aspect ratio.

FIG. 1 shows a front perspective view of the variable aspect ratio media screen frame 19 at a first aspect ratio and FIG. 2 shows another front perspective view of the variable aspect ratio media screen 19 at a second aspect ratio. Video media ranges in aspect ratios (width to height) of typically between 4:3 and 2.4:1, but other ratios can and have been used. The variable aspect ratio media screen frame can be designed to accommodate different ratios that are not presently used. The variable aspect ratio media screen frame 19 shown in these figures resizes to provide the different aspect ratios by altering the size of the external frame side member 20 and 21. The frame is made from rigid materials like steel, aluminum or plastic, but other materials are contemplated that would provide equivalent or superior performance. The center bezel area 30 remains essentially unchanged. The video content can then be shown within the frame with one or more movable external frame wings, thereby eliminating masking panels entirely. Rather than cover the unused portion of the display medium with masking panels, the variable aspect ratio media screen changes the external proportions 20 and 21 of the frame, and deploys viewing media material as needed to produce a viewing area of variable aspect ratio. While two extreme aspect ratios are provided, it is contemplated that other ratios between these two extreme sizes can be obtained. It is further contemplated that aspect ratios outside of these two ratios can also be obtained.

The variable aspect ratio media screen includes a frame or chassis consisting of a fixed central portion and one or more movable side wing(s). The movable side wing 20 and 21 nests inside the center bezel 30. The movable side wing nests inside said fixed central portion for a smaller aspect ratio and at least partially exists outside of the fixed central portion for a larger aspect ratio.

It is contemplated that the movable side wing 20, 21 operates with a motorized motion device, cable, spring, drive belt, rollers, lead screw and linear bearing. The variable aspect ratio media screen allows deploying viewing media (while moving to larger aspect ratios) and hiding viewing media (when moving the frame to smaller aspect ratios) so as to maintain a flat even surface.

Figure 3:
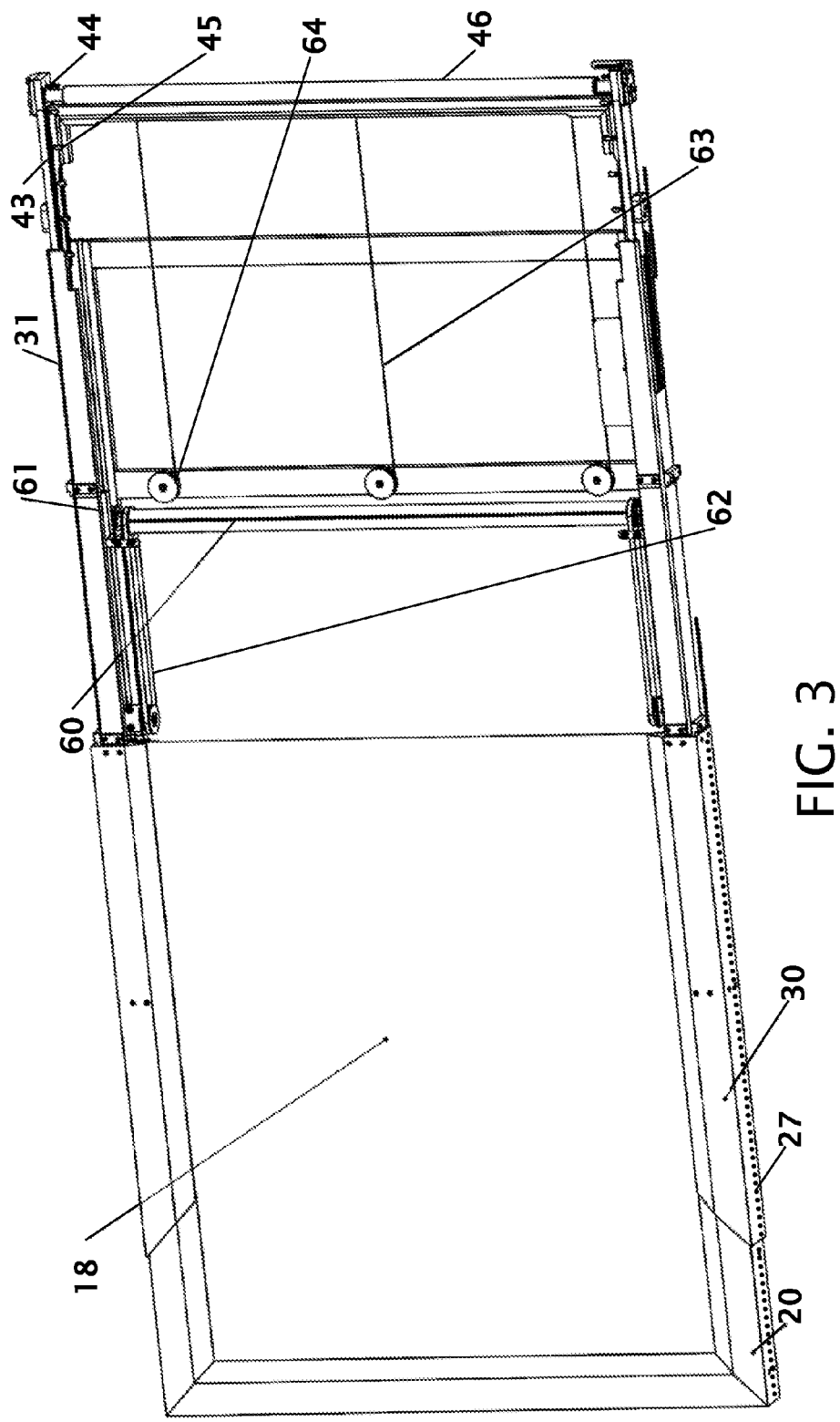
FIG. 3 shows a front view with a portion of the screen and frame removed to view the mechanism.

FIG. 3 shows a front view with a portion of the screen 18 and frame removed to view the mechanism. The left portion of this view shows the screen front 18 framed in the wing bezel 40 that extends or telescopes from the center bezel 30. The right side of this figure shows the center chassis frame 31 secured to the center bezel 30 and the wing chassis frame 43, that is secured to the wing bezel 40.

To extend or retract the wing chassis frame 43 and the wing bezel 40, a motor drive 60 is operated to turn a drive pulley 61. The drive pulley 61 then moves a drive belt 62 that extends or retracts the wing chassis frame 43 and the wing bezel 40. As the wing chassis frame 43 and the wing bezel 40 move the screen rolls around the idler roller 46. The screen wraps around the idler roller 46 and the end of the screen is secured in a screen tension bar (shown in FIG. 5. A plurality of tension cables 63 that are pulled by spring tensioners 64 maintain the screen in a taught condition. The ends of the idler roller 46 are held in a "U" channel 44. A screen hanger car 45 maintains the vertical position of the screen tension bar 65 and the screen within the frame.

The outer area of the frame may include a lighting system like the LED's 27 that can border the frame to illuminate the outer portion of the frame that can supplement or compliment the content being shown, or just provide additional illumination to the surrounding area.

Figure 4:
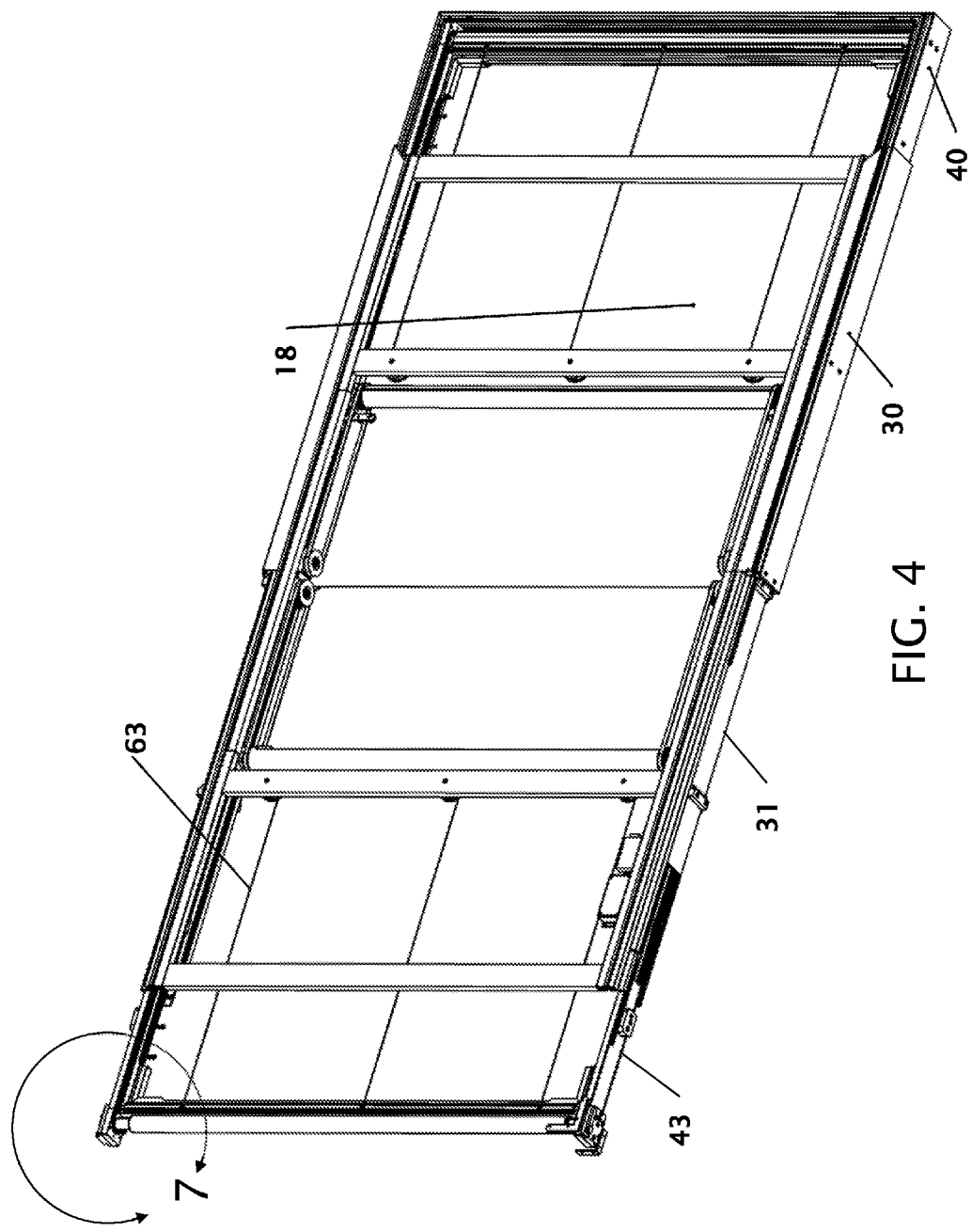
FIG. 4 shows a rear view with the mechanical linkages.

FIG. 4 shows a rear view with the mechanical linkages. The right side of this figure has the wing bezel 40 and the center bezel 30 installed, but in the the left side of this figure the bezels have been removed to show the center chassis frame 31 and the wing chassis frame 43. The tension cables 63 that maintain the screen 18 in tension are also shown.

This is embodied in a device which allows the viewing media to "roll" from the front of the viewing area, into a storage area encased in the movable frame, and out of view. The current embodiment employs a "U" shaped roller channel to marshal the screen from the front to the back of the frame and springs to maintain even tension on the viewing media at all times.

Figure 5:
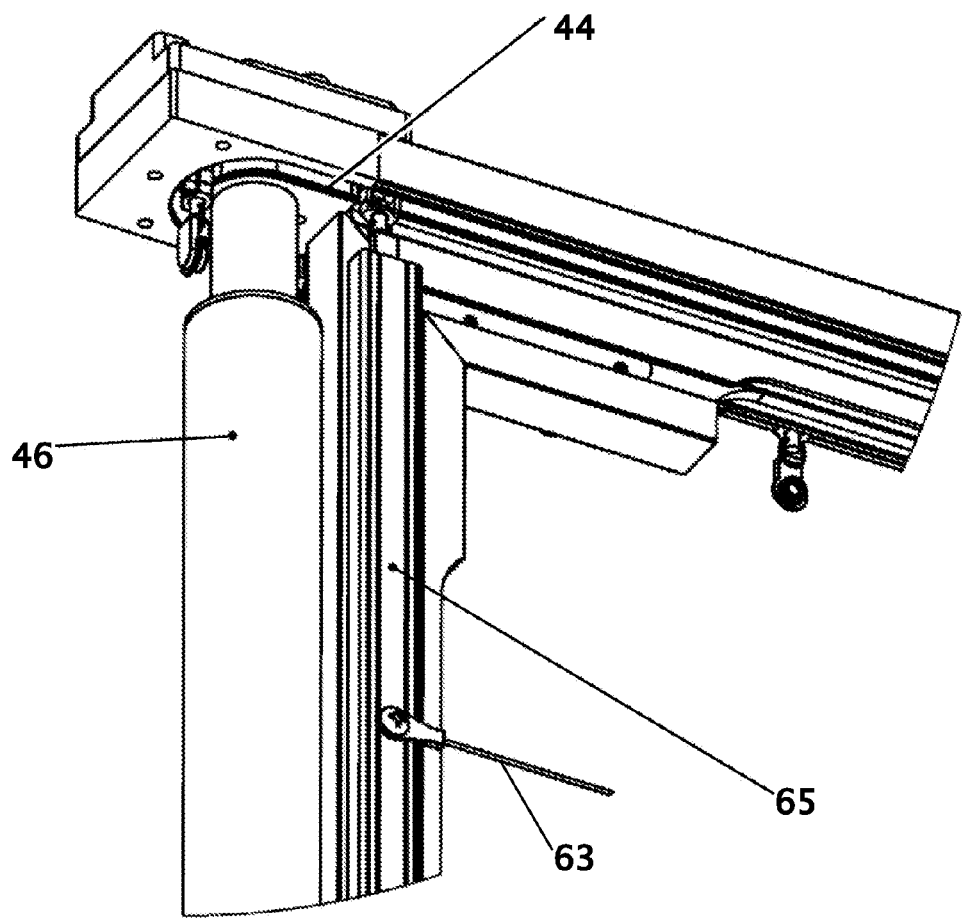
FIG. 5 shows a detail view of the corner structure from FIG. 4.

FIG. 5 shows a detail view of the corner structure from FIG. 4. In this figure the idler roller is shown. The screen wraps around the idler roller and the screen is captured in the screen tension bar that maintains the tension on the screen by the tension cable(s) 63. The end of the idler roller 46 is mounted in the "U" channel where the idler roller 46 is free to turn.

Figure 6:
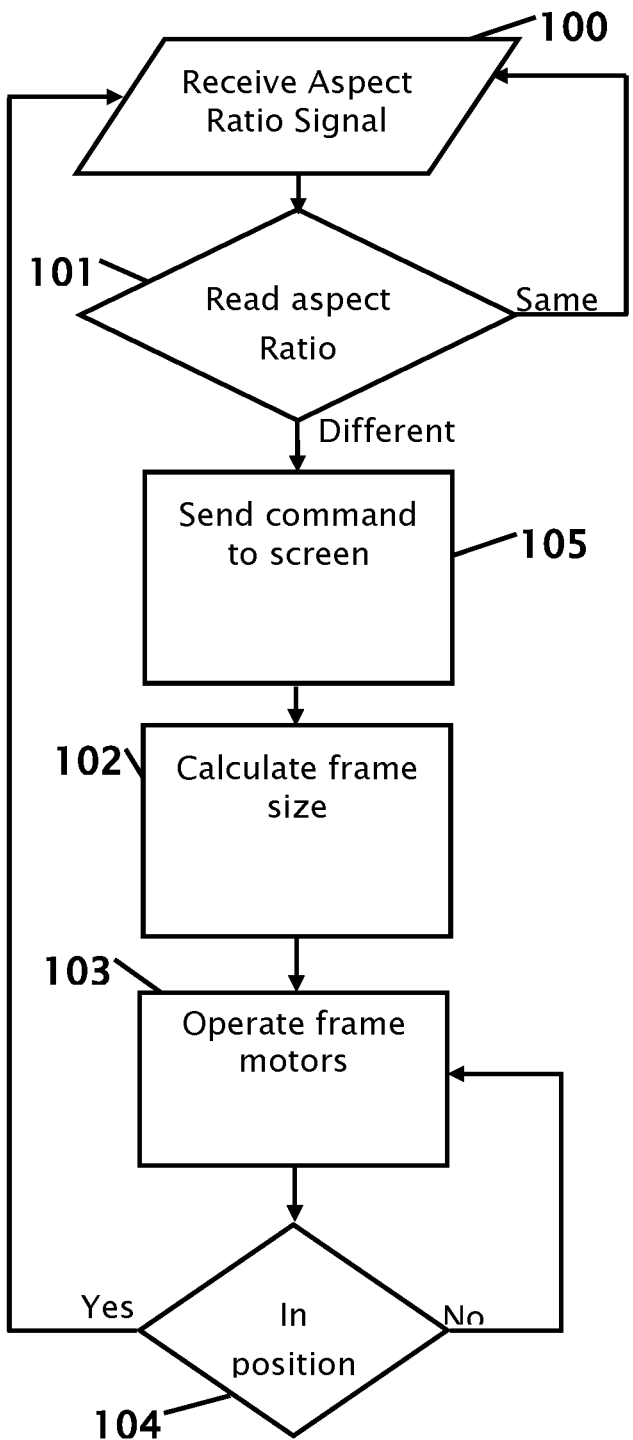
FIG. 6 shows a block diagram of a contemplated control circuit.

FIG. 6 shows a block diagram of a contemplated control circuit. As the screen frame receives the aspect ratio signal 100 the video signal contains information regarding the aspect ratio of the video content. This information can be received at the beginning of the transmission or can be sent continuously as the video signal is being received. When the information regarding the aspect ratio is received 101 the current aspect ratio is compared to the aspect ratio of the video content. If the aspect ratio is the same, then no change is made to the screen frame size. If the image to the screen is a different size or the new screen is the same, a command can be sent to the slave screen to determine if the aspect ratio needs to be adjusted to accommodate a different (or the same) aspect ratio.

If the aspect ratio is different the screen frame size is calculated 102. If there are only two distinct screen sizes the calculation step can be eliminated and the frame can be adjusted between two distinct sizes. The host unit sends a command and the motors or actuator(s) are operated 103. When the screen frame reaches the desired position movement of the actuators is stopped 104.

While a screen frame is shown and described, the screen frame could also be a flexible LCD, LED or OLED screen that changes size to only show the pixels that are illuminated. In the preferred embodiment the screen is a flexible screen and can roll or curl on the ends to change its size while maintaining the same border thickness.

Thus, specific embodiments of a variable aspect ratio media screen frame have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A variable aspect ratio media screen frame comprising:
a frame or chassis consisting of a fixed center section, a fixed upper section and a fixed lower section;
at least one movable side frame section;
a flexible display screen section extending between said at least one movable side frame section;
at least one idler roller section wherein each roller is located in each of said at least one movable side section;
said flexible display screen section is at least partially wrapped on each of said at least one idler roller section, and wraps at least partially behind said fixed center section and a viewing surface;
said at least one movable side frame section moves relative to said fixed center section, and
said at least one movable side frame section deploys said flexible display screen and said at least one idler roller section to alter a height to width ratio of a visible portion of said frame and said flexible display screen section.

2. The variable aspect ratio media screen frame according to claim 1 wherein said at least one movable side frame section operates with a motorized drive.

3. The variable aspect ratio media screen frame according to claim 2 wherein said motorized drive operates a cable, spring, drive belt, rollers, lead screw, gear, rack and pinion or linear bearing to move at least one screen hanger car.

4. The variable aspect ratio media screen frame according to claim 1 wherein said at least one movable side frame section operates with an actuator.

5. The variable aspect ratio media screen frame according to claim 4 wherein said actuator operates a cable, spring, drive belt, rollers, lead screw or linear bearing to extend and retract said at least one movable side frame section from said fixed upper section and said fixed lower section.

6. The variable aspect ratio media screen frame according to claim 1 that includes a separate projector communicates with said media screen.

7. The variable aspect ratio media screen frame according to claim 6 wherein said separate projector transmits an aspect ratio.

8. The variable aspect ratio media screen frame according to claim 7 wherein said aspect ratio compares a present aspect ratio to a new aspect ratio to determine if there is a difference.

9. The variable aspect ratio media screen frame according to claim 8 wherein if there is a difference said media screen calculates an adjustment to move said at least one movable side frame section.

10. The variable aspect ratio media screen frame according to claim 1 wherein at least one vertical end of said flexible display screen is secured to a string hanger car that is pulled by at least one spring tensioner.

11. A variable aspect ratio media screen frame comprising:
a frame or chassis consisting of a fixed central portion;
at least one movable top or bottom wing that extend beyond said fixed central portion;
said at least one movable top or bottom wing nests inside the fixed center frame;
said at least one movable top or bottom wing nests inside said fixed central portion for a smaller aspect ratio;
said at least one movable top or bottom wing section that operates with a motorized drive, and
said at least one movable top or bottom wing nests at least partially outside of said fixed central portion for a different aspect ratio.

12. The variable aspect ratio media screen frame according to claim 11 wherein said motorized drive operates a cable, spring, drive belt, rollers, lead screw or linear bearing to move at least one screen hanger car.

13. The variable aspect ratio media screen frame according to claim 11 wherein said motorized drive is with an actuator.

14. The variable aspect ratio media screen frame according to claim 13 wherein said actuator operates a cable, spring, drive belt, rollers, lead screw or linear bearing to extend and retract said at least one movable side frame section from said fixed upper section and said fixed lower section.

15. The variable aspect ratio media screen frame according to claim 11 that includes a separate projector communicates with said media screen.

16. The variable aspect ratio media screen frame according to claim 15 wherein said separate projector transmits an aspect ratio.

17. The variable aspect ratio media screen frame according to claim 16 wherein said aspect ratio compares a present aspect ratio to a new aspect ratio to determine if there is a difference.

18. The variable aspect ratio media screen frame according to claim 17 wherein if there is a difference said media screen calculates an adjustment to move said at least one movable top or bottom wing.

19. The variable aspect ratio media screen frame according to claim 11 wherein at least one vertical end of said flexible display screen is secured to a string hanger car that is pulled by at least one tensioner.

\* \* \* \* \*